United States Patent [19]

Satake et al.

[11] Patent Number: 5,100,711

[45] Date of Patent: * Mar. 31, 1992

[54] OPTICAL RECORDING MEDIUM OPTICAL RECORDING METHOD, AND OPTICAL RECORDING DEVICE USED IN METHOD

[75] Inventors: Toshimi Satake; Tomoaki Nagai; Hiroshi Fukui; Akio Sekine; Miyuki Yokoyama, all of Tokyo, Japan

[73] Assignee: Jujo Paper Co., Ltd., Tokyo, Japan

[*] Notice: The portion of the term of this patent subsequent to Oct. 29, 2008 has been disclaimed.

[21] Appl. No.: 474,932

[22] Filed: Feb. 5, 1990

[30] Foreign Application Priority Data

Feb. 3, 1989 [JP] Japan ................... 1-25462
Feb. 9, 1989 [JP] Japan ................... 1-30677
Aug. 30, 1989 [JP] Japan ................... 1-223850

[51] Int. Cl.$^5$ ............................................ B32B 3/02
[52] U.S. Cl. ............................. 428/64; 428/65; 428/913; 430/945; 369/288; 346/76 L; 346/135.1
[58] Field of Search ............... 428/64, 65, 913; 369/288; 346/76 L, 135.1; 430/945

[56] References Cited

U.S. PATENT DOCUMENTS

| | | | |
|---|---|---|---|
| 4,853,361 | 8/1989 | Satake et al. | 428/913 |
| 4,853,362 | 8/1989 | Satake et al. | 428/913 |
| 4,853,363 | 8/1989 | Satake et al. | 428/913 |
| 4,882,310 | 11/1989 | Arai et al. | 428/913 |

*Primary Examiner*—Patrick J. Ryan
*Assistant Examiner*—Elizabeth Evans
*Attorney, Agent, or Firm*—Cushman, Darby and Cushman

[57] ABSTRACT

Features of the present invention are connected with an optical recording medium which comprises a substrate, a heat-sensitive color-developing layer containing a basic dye and an organic developer, and a light-absorbing layer containing a near infrared absorbent, the aforesaid layers being superposed upon the substrate, a reflectance at the dominant wave length of a laser beam on the surface of the recording medium being from 15 to 65%; a method for recording by irradiating the optical recording medium with a laser beam condensed by a condenser having a focal length of 0.5 mm or more and a numerical aperture (N.A) of 0.1 to 0.5; and a device for use in the above-mentioned method.

6 Claims, 1 Drawing Sheet

FIG. 1

OPTICAL RECORDING MEDIUM OPTICAL RECORDING METHOD, AND OPTICAL RECORDING DEVICE USED IN METHOD

BACKGROUND OF THE INVENTION (i) Field of the Invention

The present invention relates to a laser beam-recording medium comprising a substrate, a light-absorbing layer and a heat-sensitive color-developing layer thereon and having a reflectance of 15 to 65% at a laser beam dominant wave length on the surface thereof, a method for recording by irradiating the recording medium with a laser beam, and a device used in this recording method.

(ii) Description of the Prior Art

In a direct recording system which does not require any development and fixing, heat-sensitive recording papers in which a basic dye and an organic developer are used as color developing agent are excellent in operation and maintenance. For this reason, the direct recording system is widely utilized in facsimiles, printers and the like.

In this system, however, the recording is thermally made by bringing a thermal head or an exothermic IC pen into direct contact with a heat-sensitive recording paper, and therefore melted colored substances adhere to the thermal head or the exothermic IC pen, so that troubles such as dregs adhesion and sticking take place, which brings about record obstruction and impairs record quality inconveniently.

In particular, when a line is depicted continuously in a recording direction as in the case of a plotter printer, it is impossible to avoid the trouble of the dregs adhesion.

Furthermore, when the recording is made by the thermal head, it is difficult to heighten an image resolution up to 8 dots/mm or more.

Thus, as techniques by which troubles such as the dregs adhesion and the sticking are solved and by which the resolution is more improved, some non-contact recording systems using light have been suggested.

Japanese Patent Laid-open Publication No. 4142/1979 discloses a heat-sensitive recording medium prepared by coating a substrate with a heat-sensitive recording layer mainly comprising a leuco dye, and in this recording medium, a metallic compound having a lattice defect is used. This metallic compound absorbs beams in visible and infrared regions, so that thermal conversion occurs, thereby achieving the heat-sensitive recording.

Japanese Patent Laid-open Publication No. 209594/1983 discloses an optical recording medium prepared by laminating at least one set of a near infrared absorbent layer having an absorption wave length in a near infrared region of 0.8 to 2 $\mu$m and a heat-sensitive color-developing material layer onto a substrate, and Japanese Patent Laid-open Publication No. 94494/1983 discloses a recording medium prepared by superposing, on a base material, a layer containing one or more kinds of heat-sensitive color-developing materials and a layer containing one or more kinds of near infrared absorbents comprising compounds having a maximum absorption wave length in near infrared rays of 0.7 to 3 $\mu$m. The recording onto these recording mediums can be carried out by the use of a thermal plate and a laser beam having a wave length in the vicinity of near infrared rays.

Judging from the fact that the optical recording devices are prevalently used in office works and usual measurements, the output of the usable lasers must be low. In small-sized lasers which can be used in such recording devices, a dominant wave length is from 650 to 1500 $\mu$m in the vicinity of near infrared rays.

Furthermore, in Japanese Patent Laid-open Publication No. 209594/1983 and the like mentioned above, the near infrared absorbent and the heat-sensitive color-developing material are applied on the substrate or the base material. That is, these materials are mixed and the resulting mixture is then applied onto the substrate or the base material, or alternatively when the heat-sensitive color-developing material is first applied on the substrate or the base material, and the near infrared absorbent is then applied on this material layer.

When an optical recording medium comprising the combination of the conventional heat-sensitive material and a light absorbent is irradiated with near infrared rays, recording is carried out on the so-called heat-sensitive color-developing dye material comprising a basic color dye and an organic developer which are used in the field of heat-sensitive recording papers. Therefore, the recorded color information fades and vanishes inconveniently, when brought into contact with a solvent, a plasticizer, an oil or a fat.

In the field of the heat-sensitive recording papers, it is known to form a protective layer of a water-soluble binder on the heat-sensitive recording layer so as to improve the above-mentioned inconvenient point, but the protective layer coating film is thin, and its barrier properties are imperfect. After all, the fading and disappearance of the recorded color information by the solvent or the like cannot be prevented completely. It can also be contrived to increase the thickness of the protective coating film. However, the heat energy from a thermal head lowers in inverse proportion to the square of the thickness of the protective layer, and thus, if the thickness of the protective layer is 4 microns or more, it is difficult to perform the recording dynamically. In addition, thermal diffusion increases simultaneously, so that recording density and resolution deteriorate. Moreover, the protective coating film is hard to dry in the manufacturing process of the recording papers, and hence workability is also bad.

The above-mentioned publications disclose the optical recording mediums in which non-hydrophilic materials such as plastic plates and films are used as the base materials, and the optical recording mediums in which papers which are hydrophilic materials are used as the base materials. However, they do not elucidate conditions which the practical optical recording mediums have in connection with a laser beam.

In the case of photodiscs, reading can be mechanically made, and so an optical contrast in a reading wave length is enough. However, in the recording medium of the present invention, such a contrast as to be readable by the naked eye is required, since the recorded information is read directly visually by a man.

In particular, the substrate of the optical recording medium which is a hydrophilic material such as a paper is much rougher on the surface thereof than the photodisc in which a non-hydrophilic material such as a plass and a plastic plate is used as the base material. In the case that the substrate is the paper, the depth of each recess on the rough surface of this paper is usually from 5 to 6 microns, and the winding of the paper is also great at times. Therefore, with regard to the stop down of a focal point, some allowance is inevitably necessary.

SUMMARY OF THE INVENTION

An object of the present invention is to provide an optical recording medium on which visually directly readable images are recored even by a low output laser beam having a dominant wave length in the vicinity of near infrared rays.

Another object of the present invention is to provide an optical recording medium by which conditions of a practical optical recording medium are met in connection with a laser beam.

Still another object of the present invention is to provide an optical recording medium which has high recording density and resolution and which is capable of protecting recorded images from their fading and disappearance by a solvent, a plasticizer, an oil or a fat and from unexpected color development by external pressure.

A further object of the present invention is to provide a method for recording a visually directly readable image by a laser beam on an optical recording medium in which a hydrophilic substrate such as a paper is used.

A still further object of the present invention is to provide an optical recording device for recording an image on such a type of optical recording medium.

DETAILED DESCRIPTION OF THE INVENTION

The above-mentioned problems can be solved by an optical recording medium comprising a substrate, a heat-sensitive color-developing layer containing a basic dye and an organic developer and a light-absorbing layer containing a near infrared absorbent on the substrate, the aforesaid optical recording medium having a reflectance of 15 to 65% at a laser beam dominant wave length in the vicinity of near infrared rays on the surface thereof.

In the present invention, a laser having the dominant wave length in the vicinity of near infrared rays is used. With regard to the low-cost lasers which can be used in presently prevalent recording systems, their dominant wave length is from 650 $\mu$m to 1500 $\mu$m.

On the other hand, the organic near infrared absorbent used in the present invention can absorb a light of 700 to 900 $\mu$m irrespective of being water-soluble, and its coating layer is clearly colored.

Visual reading of an image recorded on the optical recording paper by laser beam irradiation is different from mechanical reading in several points. That is, in the case of the mechanical reading, colors can be read without any problem, whereas in the case of the visual reading, a contrast between the visually readable image and a ground color must be great to a certain extent.

In an optical recording medium of the present invention which recording is directly made by the use of a semiconductor laser beam with an output range of 5 to 150 mW, the present inventors have found that the recording having visually readable contrast can only be possible in the case that a reflectance on the surface of the recording medium is in the range of 15 to 65%.

This fact is concretely described below:

In the case that the reflectance on the surface of the optical recording medium at the laser dominant wave length is less than 15%, the absorption of light is performed sufficiently, and therefore the density of an image is amply high. However, the visual contrast between the image and a ground color is so low that visual reading is difficult. Furthermore, in the case that the reflectance on the surface of the optical recording medium at the laser dominant wave length is more than 65%, the low output laser beam from a semiconductor is absorbed poorly, and generated heat energy is insufficient, so that any image is not recorded thereon, or even if it can be recorded, it is in the state of a low density. In consequence, also in this case, the contrast between the image and the ground color is too weak to read the same by the naked eye.

The optical recording medium of the present invention is composed of the substrate, the heat-sensitive color-developing layer and the light-absorbing layer as described above, the latter layers being superposed upon the substrate, but the order of superposition is not particularly limited. For example, the order of the substrate, the heat-sensitive color-developing layer and the light-absorbing layer or the substrate, the light-absorbing layer and the heat-sensitive color-developing layer may be acceptable. Furthermore, a protective layer may be disposed on the uppermost layer of the recording medium for the purpose of inhibiting the influence from the outside. In particular, when the heat-sensitive color-developing layer is the uppermost layer, preferable results can be obtained. In addition, it is also preferred to add a near infrared absorbent to the protective layer so as to cause the protective layer to simultaneously have the function as another light-absorbing layer.

Moreover, a pigment layer which does not prevent heat transfer noticeably may be disposed between the light-absorbing layer and the heat-sensitive color-developing layer.

The light-absorbing layer disposed under the heat-sensitive color-developing layer can be prepared usually by coating a substrate with a coating material comprising a near infrared absorbent, a binder, a white pigment. This white pigment effectively reflects the visible rays and the near infrared rays in order to effectively provide the near infrared absorbent around the white pigment with the near infrared rays.

The light-absorbing layer disposed on the heat-sensitive color-developing layer is required to be transparent, and therefore it can be prepared usually by coating the heat-sensitive color-developing layer with a coating material comprising a binder and a near infrared absorbent. Therefore, it is a preferable way to add the near infrared absorbent to the transparent protective layer so that the latter layer may have both the functions of the protective layer and the light-absorbing layer.

The light-absorbing layer may be disposed under the heat-sensitive color-developing layer and the protective layer containing the near infrared absorbent may be disposed on the heat-sensitive color-developing layer. In this case, if a predetermined amount of the near infrared absorbent is shared between the upper and lower layers, the coloring of the optical recording medium can be improved.

The near infrared absorbent is not particularly limited, but when the substrate is a hydrophilic material, it is preferable to make use of the water-soluble near infrared absorbent or the finely ground dispersible near infrared absorbent, and particularly the water-soluble near infrared absorbent is preferred.

Some optical recording mediums utilizing the near infrared absorbent are already known as described above, but examples in which the water-soluble near infrared absorbent is employed are restricted.

Since one object of the present invention is to obtain the optical recording medium which can be handled directly by a man and on which a visual image can be recorded, the near infrared absorbent is preferably safe in handling it. The water-soluble compound is not accumulated in a human body, and so the employment of such a type of absorbent is recommendable. In the case that the hydrophilic substrate is used, the water-soluble near infrared absorbent can be used in the state of an aqueous coating material, and a conventional coating apparatus for an aqueous coating material can be utilized conveniently without any modification. In addition, the water-soluble near infrared absorbent is uniformly present in the coating material, and thus the absorption of the near infrared rays is carried out uniformly throughout, so that a uniform image having a high resolution can be obtained. The water-soluble near infrared absorbent has a greater near infrared absorption power per unit weight as compared with the dispersible near infrared absorbent, which permits decreasing its amount. This is economical, and even when the near infrared absorbent is colored, the ground color of the optical recording medium can be improved.

The water-soluble near infrared absorbent in the present invention is a material dissolvingly containing the near infrared absorbent which can absorb the near infrared rays and release heat energy necessary to obtain a desired record density. The amount of the near infrared absorbent depends upon the near infrared absorption power of the near infrared absorbent itself, the composition of the optical recording medium, the output of a laser beam, a light condensation degree and a distance between a light source and a recording surface. According to experiments, if the solubility of the near infrared absorbent in water is 5% or more, it can become the water-soluble near infrared absorbent in most cases. Preferably, the solubility of the near infrared absorbent in water is 10% or more. Accordingly, what does not meet the above-mentioned conditions is the dispersible near infrared absorbent.

Generally, the dispersible near infrared absorbent which does not undergo any additional treatment is poor in absorption efficiency and heat conversion efficiency of the near infrared rays, probably because of a great particle diameter. If the dispersible near infrared absorbent is applied in an amount enough to obtain the desired record density, the optical recording medium is strongly colored, so that the contrast of the image tends to deteriorate. In the present invention, therefore, the dispersible near infrared absorbent is finely ground prior to using. With regard to the degree of the fine grinding, the smaller the particle size is, the better, but the present inventors have found that in practice, an average particle diameter of 3 μm or less is enough. The fine grinding can be achieved in a water-soluble binder by means of an attritor, a sand grinder or the like.

When the heat-sensitive color-developing layer is superposed upon the substrate and the protective layer containing the near infrared absorbent is disposed on the heat-sensitive color-developing layer, the heat-sensitive color-developing layer is naturally protected by the protective layer, and the rough surface on the substrate is smoothed with the heat-sensitive color-developing layer. In consequence, the thickness of the light-absorbing protective layer can be uniformed, so that light absorption power and heat generation power are also uniformed, which contributes to the uniformalization of an image density. In order to obtain such a uniform protective layer, the light-absorbing material must be water-soluble or must be dispersed in the state of fine particles therein. In particular, when the water-soluble light-absorbing material is used, the light transmission of the light-absorbing layer is heightened, and the light absorption is carried out all over the light-absorbing layer, whereby light absorption efficiency can be enhanced.

The light-absorbing layer can usually be prepared by coating the hydrophilic substrate with a coating material comprising the near infrared absorbent, a binder and, if necessary, a white pigment.

The near infrared absorbent is what can absorb light in the near infrared region of 0.7 to 3 μm. Examples of the near infrared absorbent include cyanine dyes, thiol nickel complexes and squalium dyes disclosed in Japanese Patent Laid-open Publication Nos. 4142/1979, 209594/1983 and 94494/1983; nitroso compounds and their metallic complexes, polymethylene dyestuffs (cyanine dyestuffs), a complex of thiol and cobalt or palladium, phthalocyanine dyestuffs, triallylmethane dyestuffs, immonium or diimmonium dyestuffs and naphtoquinone dyestuffs mentioned in "Near Infrared Absorption Dyestuffs", Chemical Industry, 43, May 1986; organic acid salts of thiourea derivatives such as 1,3-diphenylthiourea or 1,3-dibenzylthiourea and metals having atomic weight of 40 or more except elements in the groups Ia and IIa of the periodic table, products obtained by mixing and then heating alcoholates and hydroxides which the present inventors have found; and dispersible near infrared absorbents such as copper sulfide and graphite described in Japanese Patent Application No. 272702/1988 regarding an optical recording medium using a dispersible near infrared absorbent which has been filed by the same applicant as in the present case. Furthermore, known near infrared absorbents such as cyanine dyestuffs, thiol nickel complexes and triallymethane dyestuffs are dissolved in water or a solvent when used, and typical examples of such absorbents are mentioned in Japanese Patent Application No. 272702/1988 referred to above.

Examples of the water-soluble near infrared absorbent used in the present invention include S116510 and S109564 which are the near infrared absorbents made by ICI and the following compounds, but they are not restrictive:

The heat-sensitive color-developing layer is all the same as the color-developing layer of a heat-sensitive recording paper in which a known electron-donating colorless dye and an electron-accepting organic developer are used as color-developing components, and all the techniques which are known about the color-developing layer of the heat-sensitive recording paper can be applied. Examples of the basic colorless dye include leuco dyes, for example, triphenylmethane dyes such as crystal violet lactone, fluoran dyes such as 3-diethylamino-6-methyl-7-anilinofluoran, azaphthalide dyes such as 3-(4-diethylamino-2-ethoxyphenyl)-3-(1-ethyl-2-methylindole-3-yl)-4-azaphthalide, and fluoreine dyes such as 3,6,6'-tris(dimethylamino)spiro(fluoreine-9,3-phthalide.

Examples of the organic developer include bisphenol A's, 4-hydroxybenzoic acid ester, 4-hydroxyphthalic acid diesters, phthalic acid monoesters, bis-(hydroxyphenyl)-phenyl sulfides, 4-hydroxyphenylarylsulfones, 4-hydroxyphenylaryl sulfonates, 1,3-di[2-(hydroxyphenyl)-2-propyl]-benzenes, 4-hydroxybenzoyloxybenzoic acid ester and bisphenolsulfones.

Examples of the binder include completely saponified polyvinyl alcohol having a polymerization degree of 200 to 1900, a modified polyvinyl alcohol such as amide-modified polyvinyl alcohol, hydroxyethyl cellulose and styrenebutadiene copolymer.

In addition, a fatty acid amide or montan wax may be used as a sensitizer or a quality regulator, and a filler such as clay, $CaCO_3$ and a plastic pigment which are usually used in the field of paper manufacture may be added. In particular, a hollow plastic pigment is preferable because of excellent reflection of near infrared rays and because of good heat retention. In the present invention, as these various materials used in the heat-sensitive color-developing layer, there may be simultaneously used the basic colorless dye, the organic developer, the binder, the sensitizer, the filler and the quality regulator mentioned in Japanese Patent Application No. 272702/1988 which has been filed by the same applicant as in the present case.

Kinds and amounts of various components such as the organic developer, the basic colorless dye, the binder, the sensitizer and the filler in the color developing layer used in the present invention depend upon a desired performance and recording properties. However, it is usually desirable that the organic developer is 3 to 12 parts, the sensitizer is 3 to 12 parts and the filler is 1 to 20 parts based on 1 part of the basic colorless dye, and the binder is 10 to 25 parts in the total solid of the color-developing layer.

The organic developer, the basic colorless dye and the sensitizer are finely ground separately or together with other necessary materials by means of a grinder such as a ball mill, an attritor or a sand grinder or a suitable emulsifying device in order to obtain a particle diameter of several microns. The thus finely ground materials are then mixed, and the binder and, if necessary, the above-mentioned various quality regulators are added thereto to prepare a heat-sensitive color-developing coating liquid. The latter liquid is then applied on the substrate or the light-absorbing layer in order to become the heat-sensitive color-developing layer. When the heat-sensitive color-developing layer is superposed upon the light-absorbing layer, the color of the light-absorbing layer is further hidden, so that the optical recording medium having a preferable appearance is obtained.

It is preferred that the protective layer is disposed on the surface of the heat-sensitive color-developing layer to diminish or control the influence of outer contaminants such as moisture, gases, water and solvents.

The preferable protective layer is permeable to visible light and does not inversely affect the heat-sensitive color-developing layer. Usually, the protective layer is made of one or more selected from the binders which are used in the heat-sensitive color-developing layer. When the water-soluble near infrared absorbent is added to the protective layer or is interposed between the protective layer and the heat-sensitive color-developing layer, the sensitivity of the optical recording medium is further heightened.

When reflectance on the surface of the recording layer at the dominant wave length of a recording laser beam is 15 to 65%, and when the surface of the protective medium is subjected to a reflection prevention treatment, an image having a high density and a high resolution can be obtained by a low output recording laser beam. This indicates that the object of the present invention can be accomplished more effectively.

The thus obtained optical recording medium having the protective medium of the present invention can be utilized for information recording papers, output papers for drawing and laser disc mediums.

In the case that the recording is performed by a thermal head, the heat energy fed to the heat-sensitive color-developing layer through such a protective layer lowers in inverse proportion to the square of the distance from a heat source, and thus, if the thickness of the protective layer is 4 microns or more, it is difficult to perform the recording dynamically. On the contrary, in the case of the optical recording medium of the present invention, the protective medium is permeable to the recording light, and therefore when a condensed point is set on the surface of the heat-sensitive color-developing layer, the energy of the recording light can be utilized for the color development without any loss of the energy.

In this case, the recording layer of the present invention contains a heat-sensitive color-developing material comprising a basic colorless dye (hereinafter referred to as "dye") and an organic developer (hereinafter referred to as "developer") which can cause the dye to develop a color when dissolved by heat, and water which absorb near infrared rays and release heat or an organic solvent-soluble near infrared absorbent (hereinafter referred to as "soluble near infrared absorbent") or either or both of water and an organic solvent-insoluble near infrared absorbent (hereinafter referred to as "dispersible near infrared absorbent").

The recording layer can contain the dye, the developer and the near infrared absorbent in an optional manner. For example, there are a method in which the near infrared absorbent is dispersed or dissolved in a layer (hereinafter referred to as "heat-sensitive color-developing layer") containing the dye and the developer, a method in which a layer (hereinafter referred to as "near infrared-absorbing layer") containing the near infrared absorbent is disposed on or under the heat-sensitive color-developing layer, and a method in which the near infrared absorbent is previously dispersed in the developer or a thermally meltable material which is usually used in a heat-sensitive recording field, and the resulting dispersion is then mixed with the dye. Of these methods, in the method in which the near infrared absorbent is directly added to the heat-sensitive color-developing layer as disclosed in Japanese Patent Laid-open Publication Nos. 209594/1983 and 94494/1983, the near infrared absorbent acts on the dye, so that the dye develops a color, and desensitization occurs sometimes. Therefore, prior to using this method, it is necessary to confirm whether or not the inconvenient coloring and desensitization take place.

When needed, a layer mainly comprising a water-soluble polymer may be disposed under the heat-sensitive color-developing layer as an underlayer or on the surface of the heat-sensitive color-developing layer as a top layer. These layers function to improve image quality and to inhibit the volatilization of a material formed by light irradiation. Furthermore, when the near infrared absorbent is added to the underlayer or the top layer, the optical recording medium having an extremely high sensitivity can be obtained. In this case, the dispersible near infrared absorbent may be added to the underlayer and the soluble near infrared absorbent may be added to the top layer. This manner is preferable, because the dispersible near infrared absorbent which is inexpensive and excellent in absorption efficiency but which has strong coloring properties is combined with the soluble near infrared absorbent which has less coloring properties but which is expensive.

In addition, it is preferable in point of the effective utilization of energy of a recording light to add a white pigment to the underlayer. Above all, the empolyment of a hollow pigment is very preferable which is excellent in light reflectivity and heat retention. In the case that the optical recording medium is an optical recording paper, writing and reading on a photodisc are performed by a laser beam, and therefore a spot diameter is at a level of 1 micron. On the contrary, in the present invention, the reading is done by the naked eye, and so the spot diameter is preferably about 10 to about 100 microns. When the white pigment is added to the underlayer, the recording light is reflected by the pigment, so that the spot is enlarged suitably, which is particularly convenient.

The near infrared absorbent may be added to an adhesive layer or a tackifier layer which is used to stick the protective medium on the recording layer, or alternatively the near infrared absorbent may be applied on the protective medium, and the latter is then sticked on the heat-sensitive layer by bringing the applied surface of the protective layer into contact therewith without using any adhesive layer and tackifier layer.

In the present invention, when used as the near infrared absorbent, the dispersible near infrared absorbent should be finely ground so as to achieve the optically uniform recording. The fine grinding can be carried out by means of a known mill such as a sand grinder and an attritor. Preferably, the average particle diameter of the infrared absorbent particles is 1 micron or less, and in particular, it is preferred that most of the infrared absorbent particles are 1 micron or less.

The amount of the near infrared absorbent to be used depend upon the layer constitution of the optical recording medium as well as the manner and the purpose of adding the near infrared absorbent. Anyway, it can be determined by experiments so as to obtain the desired recording.

In the case of the photodisc, a C/N ratio (carrier-to-noise ratio) is an important factor of recording properties, and if the photodisc has a C/N ratio of 50 dB or more, it is considered that this photodisc is practicable. In order to meet such conditions, reflectance is suitably 20% or more.

On the contrary, when the recording medium is the optical recording paper and when an image optically recorded by laser beam irradiation is read by the naked eye, a reading mechanism is different from the mechanical reading in some important points. That is, in the case of the mechanical reading, the coloring on the recording surface does not lead to any troubles. However, when the image is read by the naked eye, the coloring on this optical recording paper itself has an influence on a visual contrast. With regard to the near infrared absorbent having the maximum absorption wave length in the near infrared region, some absorption spectra are also present in the visible region. Usually, the greater a near infrared absorptivity is, the greater the coloring which is sensed by the naked eye is. Therefore, the degree of the coloring, i.e., the degree of the reflectance becomes an index of the amount of the near infrared absorbent to be used.

The present inventors have conducted researches about this point, and as a result, they have found that when practical restriction is put on a visual contrast and light energy, there is an essential region for the reflectance on the surface of the recording layer at the dominant wave length of a recording laser beam.

That is, in the case of the optical recording paper on which an image is read by the naked eye, the reflectance on the surface of the recording layer is preferably in the range of 15% to 65%. When the reflectance on the surface of the recording layer is 15% or less, the contrast of the image is so weak that the reading is difficult by the naked eye, though the density of the image is sufficiently high. When the reflectance is 65% or more, any image cannot be recorded substantially by the low-output laser beam from a semiconductor, or the density of the image is low and the visual contrast is weak, which makes the reading difficult.

The present invention is characterized by further disposing the protective medium on the thus obtained recording layer. The protective medium of the present invention must be substantially permeable to visible rays and near infrared rays. "The protective medium is permeable to visible rays" means that the protective medium is transparent when seen by the naked eye or that the recorded image can be read through the protective medium, even if the latter is colored. "The protective medium is permeable to near infrared rays" means that the protective medium has no absorption spectrum in the near infrared region or that the protective medium is permeable at wave lengths of the recording laser beam or at least the dominant wavelength of the recording laser beam. If the absorption spectrum exists in the wave length region of the recording laser beam, the recording energy is consumed by the protective medium, and in consequence, the energy portion which will be converted into heat by the near infrared absorbent decreases unpreferably.

The thickness of the protective medium is not particularly limited, so long as the above-mentioned conditions are met, and it depends upon usage and ambient circumstances. In general, materials which are considered to be films, sheets and plates can all be used. In order to protect the recording layer from the ambient circumstances, the protective layer preferably has no pin-holes and has a uniform thickness of 10 μm or more, and the plate having a thickness of about 5 mm can also be used without any problem. Thus, the recording medium can be obtained which is excellent in physical strength and which can be protected from ambient circumstances, in contrast to a conventional medium.

The protective medium is disposed on the recording layer and functions to protect its recording surface. It is suitable that the protective medium is closely brought into contact with the recording surface, but if necessary, space may be present between the protective layer and the recording layer. As techniques of closely bringing the protective medium into contact with the recording surface, there are a method in which the protective medium is stuck on the recording layer by the use of an adhesive or a tackifier, a method in which laminating is utilized, or a method in which the protective medium is coated with the heat-sensitive layer or the near infrared absorbent-containing layer, and a substrate is finally stuck thereon.

With regard to the material of the protective medium used in the present invention, any one can be used, so long as it is substantially permeable to visible rays and near infrared rays and permits forming a continuous structure. Examples of this kind of material include a polyester such as polyethylene terephthalate, polyvinyl alcohol, polyethylene, EVA copolymer, ionomer, polypropylene, nylon, polystyrene, polyvinyl chloride, polyvinylidene chloride, polycarbonate, polymethylpentene resin and polymethyl methacrylate. Above all, polyester, polyvinyl alcohol and polymethyl methacrylate are advantageous from the viewpoint of the permeability to the visible rays and near infrared rays.

Furthermore, it has been confirmed by the present invention that when the surface of the protective medium is coated with a reflection-preventing film, the recording light energy can be utilized more effectively.

In the present invention, the coating of the reflection-preventing film can be achieved by any of three techniques, i.e., vacuum deposition, ion plating and immersion. In the case that the reflection-preventing film is deposited in vacuo, this operation must be carried out at a low temperature. Therefore, the ion plating process is advantageous. As materials for the deposition, $MgF_2$, $SiO_2$ and $Al_2O_3$ are usable. According to this treatment, a light energy loss can be prevented as much as 10% or more.

Reference will be made to materials constituting the recording layer of the present invention.

The material for the substrate is not particularly limited, so long as it does not substantially adversely affect the coloring of the heat-sensitive material. Examples of the substrate material include papers, plastic sheets and inorganic plates such as metallic thin films and glasses, and they can be selected in compliance with a purpose.

The soluble near infrared absorbent used in the present invention is what is relatively easily soluble in a usual solvent which can be used in a coating liquid such as water, an alcohol and toluene. Typical examples of the soluble near infrared absorbent include polymethyne dyestuffs (cyanine dyestuffs), azulenius dyestuffs, pyrylium dyestuffs, thiopyrylium dyestuffs, squalium dyestuffs, croconium dyestuffs, thiol nickel dyestuffs, mercaptophenol dyestuffs, mercaptonaphthol dyestuffs, triallylmethane dyestuffs, immonium dyestuffs, diimmonium dyestuffs, anthraquinone dyestuffs and metallic complex dyestuffs disclosed on pages 16 to 25 of Japanese Patent Application No. 176558/1989 regarding an oprical recording process filed by the same applicant as in the present case.

Examples of the dispersible near infrared absorbent include artificial graphite, natural graphite, copper sulfide, lead sulfide, molybdenum trisulfide and black titanium. Furthermore, the above-mentioned soluble near infrared absorbent can also be used as the dispersible near infrared absorbent without dissolving the same in water or the solvent. The classification of the near infrared absorbent into the soluble type and the dispersible type is merely for convenience.

The heat-sensitive color-developing material is composed of the dye and the developer, and the heat-sensitive color-developing layer contains, in addition thereto, various additives to obtain the desired quality. As the dye and the developer which are heat-sensitive color-developing materials, well-known various materials for heat-sensitive recording papers can all be used.

Examples of the basic colorless dyes include triphenylmethane dyes, fluoran dyes, azaphthalide dyes, phenothiazine dyes, phenoxazine dyes, spiropyran dyes and fluorene dyes. Examples of the organic developer include bisphenol A, alkylphenols, allylphenols and their metallic salts, bisphenolsulfones, hydroxyphenyl sulfides, hydroxybenzoic acid esters and their metallic salts, hydroxyphthalic acid esters, phthalic acid monoesters, thiourea derivatives, specific polyphenols such as saccharin.

Typical compounds of these materials and typical compounds of a binder, a filler, an image stabilizer, a sensitizer and the like are mentioned in the following publications regarding the heat-sensitive recording papers:

The Journal of the Institute of Image Electronics Engineers of Japan, Vol. 4, No. 4, p. 185-194, 1975

Japanese Journal of Paper Technology, Vol. 27, No. 7, p. 1-11, 1984

Japanese Journal of Paper Technology, Vol. 27, No. 8, p. 34-41, 1984

Japanese Journal of Paper Technology, Vol. 27, No. 9, p. 65-71, 1984

Japanese Journal of Paper Technology, Vol. 28, No. 6, p. 43-50, 1985

Japanese Journal of Paper Technology, Vol. 28, No. 7, p. 49-54, 1985

Japanese Journal of Paper Technology, Vol. 28, No. 8, p. 65-70, 1985

Japanese Journal of Paper Technology, Vol. 28, No. 9, p. 29-35, 1985

Japan TAPPI Journal, Vol. 40, No. 10, p. 1-14, 1986

SHIKIZAI KYOKAISHI, Vol. 62, No. 5, p. 18-29, 1989.

Of these many compounds, those which can be suitably used in the present invention are mentioned on pages 21 to 37 of Japanese Patent Application No. 272702/1988 regarding the optical recording medium filed by the same applicant as in the present case.

The thus obtained optical recording medium is irradiated with a laser beam having a dominant wave length in the vicinity of the near infrared region which has been condensed through a group of two or more condensers each having a focal length of 0.5 to 50 mm and a numerical aperture (NA) of 0.1 to 0.5, in order to perform recording, whereby a sharp image having a good contrast can be obtained with the low-output laser beam.

In particular, in the case that a hydrophilic substrate is used which may be prepared by using a vegetable fiber such as paper, pulp or cotton and, if necessary, an animal or mineral fiber and a synthetic fiber in such an amount as not to impair the hydrophilic nature, the similarly sharp image can be obtained.

Examples of a light source necessary for the optical recording on the optical recording medium include a semiconductor laser, a diode pumping YAG laser, a Xe flashlamp, a quartz flashlamp, a halogen lamp, an He-Ne gas laser and a dyestuff laser. As the light source for a business recording device, the laser having a low output in the range of 5 to 150 mW is preferable from the viewpoints of size, safety and cost.

The laser beams output from such a laser are made parallel with each other by a lens system and then condensed through a condenser having a numerical aperture (NA) of 0.1 to 0.5 and a focal length of 0.5 mm or more, and afterward the optical recording surface is irradiated with the condensed beam. The upper limit of the focal length depends upon the output of a laser beam-generating element, the structure of a recording device, the distance between the laser beam-shooting surface and a light-receiving surface of the optical recording medium and the like. According to experiments of the present inventors, when the focal length is too great, the recording density does not rise, even if the output of the laser is heightened. In consequence, it is found that the preferable upper limit of the focal length is 50 mm.

When the focal length is 0.5 mm or less or when the NA value is 0.5 or more, the distance between the lens and the recording medium is short, so that the lens is contaminated with materials volatilized from the surface of the recording medium by the laser beam irradiation. In addition, owing to a slight rough state on the recording surface and the winding of the recording medium which cannot be avoided when the hydrophilic substrate is employed, an image focus position of the irradiation beam deviates noticeably from the recording surface, so that the recording density is inconveniently ununiformed.

Furthermore, when the NA value is 0.1 or less, a sufficient printing density cannot be obtained.

The condenser having a focal length of 0.5 mm or more and a numerical aperture of 0.1 to 0.5 can be prepared from one lens or by combining several lenses. When a large number of the lenses are combined, the output between each pair of the lenses diminishes, and so the combination of 2 to 5 lenses is preferred. As described above, in the optical recording medium in which the heat-sensitive color-developing layer containing the basic dye and the organic developer is superposed upon the light-absorbing layer containing the near infrared absorbent, the visually directly readable image can be obtained on the recording surface by the recording laser beam irradiation, the reflectance on the surface of the recording medium at a recording laser beam dominant wave length being adjusted to 15 to 65%. However, such a recording mechanism is not definite. In the case that the reflectance on the surface of the optical recording medium at the laser beam dominant wave length is less than 15%, absorption in this wave length is as high as about 65% or more, and so an image density is sufficiently high, but the visual contrast connected with the ground color is so low that reading by the naked eye is difficult. Furthermore, in the case that the reflectance on the surface of the optical recording medium at the laser beam dominant wave length is more than 65%, the light absorption is poor and the generated heat energy is insufficient, when a low-output laser beam is used. In consequence, any image cannot be recorded, or even if it can be recorded, its density is low. Thus, in this case, the visual contrast connected with the ground color is so weak that the visual reading is hard.

Moreover, in the optical recording medium in which recording is performed by the irradiation of a light having the dominant wave length in the near infrared region, the heat-sensitive color-developing material and the recording layer containing the near infrared absorbent are disposed on the substrate, the aforesaid heat-sensitive color-developing material being composed of the dye and the developer which can be thermally dissolved to cause the dye to develop a color, and the protective layer which is permeable to visible and near infrared rays is further disposed on the recording layer to form the optical recording medium having the protective layer. Thus, the recording light is condensed on the surface of the heat-sensitive color-developing layer through the transparent protective layer and then absorbed by the near infrared absorbent, whereby the light energy is converted into heat. The thus generated heat causes the nearby heat-sensitive color-developing agent to develop a color. Since the sufficiently thick protective layer which is free from any perceptible holes is put on the heat-sensitive recording layer, the optical recording medium itself and a recorded image thereon are protected from unexpected force and chemical substances such as a gas, an oil and a solvent.

As described above, when recording is performed using the laser beam condensed by the condensers each having a focal length of 0.5 mm or more and a numerical aperture (NA) of 0.1 to 0.5 on the optical recording medium in which the light-absorbing layer containing the near infrared absorbent as well as the heat-sensitive color-developing layer containing the basic dye and the organic developer are superposed upon the hydrophilic substrate, an image focus position of the irradiation beam does not deviate noticeably from the recording surface, even if there are rough state on the recording surface and the winding of the recording medium which cannot be avoided when the hydrophilic substrate is employed. In consequence, the redable record density and contrast can be obtained.

Now, the present invention will be described in detail in reference to examples. In the examples, parts and percent are by weight.

EXAMPLE 1

A dye dispersion (solution A) and a developer dispersion (solution B) having the following compositions, respectively, were separately wet-ground for 1 hour by means of a sand grinder. Next, 25 parts of a 25% silica dispersion was mixed with a mixture of 6.3 parts of the solution A and 25 parts of the solution B in order to form a heat-sensitive color-developing coating solution. Afterward, a fine paper having a basis weight of 60 g/m$^2$ was coated with 5 g/m$^2$ of this coating solution by the use of a meyer bar, followed by drying, to obtain a heat-sensitive color-developing layer.

| [Heat-sensitive color-developing layer] | |
|---|---|
| Solution A: Dye dispersion | |
| Black color-developing dye: ODB | 2.0 parts |
| 10% PVA aqueous solution | 3.4 parts |
| Water | 1.9 parts |
| Total | 7.3 parts |
| ODB: 3-diethylamino-6-methyl-7-anilinofluoran | |
| Solution B: Developer dispersion | |
| Developer: BPA | 6.0 parts |
| Parabenzylbiphenyl | 4.0 parts |
| 10% PVA aqueous solution | 12.5 parts |
| Water | 2.5 parts |
| Total | 25.0 parts |
| BPA: Bisphenol A | |

Next, 6 parts of an aqueous near infrared absorbent solution (solution C) and 105 parts of a protective layer solution (solution D) having the following compositions, respectively, were mixed with each other, and the above-mentioned heat-sensitive color-developing layer was then coated with 4 g/m$^2$ of the resulting protective layer coating solution containing the near infrared absorbent by the use of a meyer bar in order to obtain an optical recording sheet.

| Solution C: Aqueous near infrared absorbent solution | |
|---|---|
| Near infrared absorbent (ICIS116510) | 10 parts |
| 10% PVA aqueous solution | 50 parts |
| Water | 40 parts |
| Total | 100 parts |
| They were added thereto, followed by mixing, in order to obtain a gray aqueous solution. | |
| Solution D: Protective layer solution | |
| 10% PVA aqueous solution | 100 parts |
| Glyoxal (40%) | 5 parts |
| Total | 105 parts |

Figure 1:
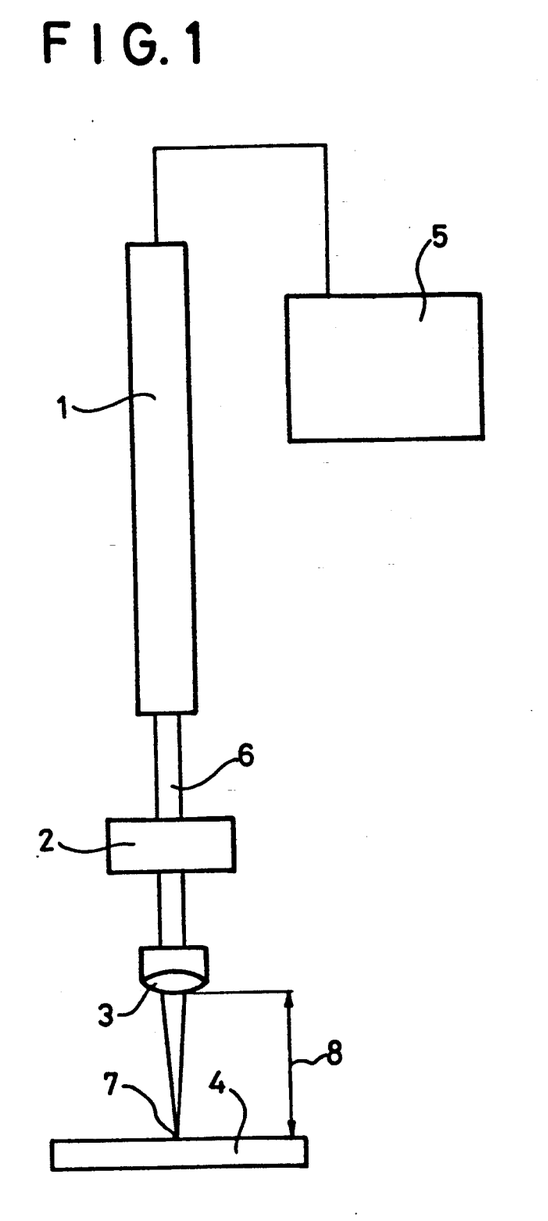
FIG. 1 is a block diagram of a laser optical recording device of the present invention.

The thus prepared optical recording paper was irradiated with a laser beam by the use of a device shown in FIG. 1 in which a semiconductor laser head (laser diode collimetor head LDC-7820-CINC; made by Applied Optic Co., Ltd., central wave length 780 nm, output 20 mW) was combined with a condenser having a numerical aperture of 0.28 in order to carry out optical printing In this case, an irradiation time was 1/500 second.

The density of the recorded image and a ground color were measured as follows, and the results are set forth in Table 1.

Density of the recorded image (colored spot): Measurement was made by the use of a microdensitometer (made by Konishiroku Photo Industry Co., Ltd.; PDM-5), and a measured value was converted into a Macbeth density.

Ground color of the optical recording paper: Measurement was made by the use of a Macbeth densitometer.

EXAMPLES 2 and 3

The same procedure as in Example 1 was repeated with the exception that a mixing ratio between the near infrared absorbent solution (solution C) and the protective layer solution (solution D) was changed so that the surface reflectances at 780 nm might be 30% and 40%, in order to obtain optical recording papers. The results of evaluation are set forth in Table 1.

EXAMPLES 4 and 5

The same procedure as in Example 1 was repeated. However, the aqueous near infrared absorbent in Example 1 was replaced with Kayasorb IR-750 which was a dispersible near infrared absorbent, and two samples of the latter were wet-dispersed by a sand grinder until average particle diameters of the samples were 2.5 μm and 1.5 μm, respectively. These samples were then mixed with the protective layer solution so that surface reflections might be 60% and 65%, respectively. Evaluation was then made, and the results are set forth in Table 1.

EXAMPLE 6

The same procedure as in Example 1 was repeated with the exception that the combination of a black dye and a developer was ODB/POB, in order to form an optical recording paper, and the latter was then evaluated. The results are set forth in Table 1.

Structures of the black dye and the developer are as follows:

Black dye: ODB: 3-diethylamino-6-methyl-7-anilinofluoran

Developer: POB: p-hydroxybenzoic acid benzyl ester

EXAMPLE 7

The same procedure as in Example 1 was repeated with the exception that the combination of the black dye and the developer was ODB-2/BPA, in order to form a heat-sensitive color-developing layer. Afterward, 8 parts of a solution in which a near infrared absorbent used in Example 1 was replaced with ICIS109564 was mixed with 105 parts of the protective layer solution, followed by coating, to form an optical absorption layer on the heat-sensitive color-developing layer, whereby an optical recording layer was obtained in which reflectance at 830 nm was 30%. On the thus formed optical recording paper, recording was made under the same conditions as in Example 1 with the exception that a semiconductor laser head having a dominant wave length of 830 nm (laser diode collimetor head LDC-8330-CINC; made by Applied Optic Co., Ltd., output 30 mW) was used, and evaluation was then done. The results are set forth in Table 1.

ODB-2: dibutylamino-6-methyl-7-anilinofluoran

EXAMPLE 8

The same procedure as in Example 1 was repeated, but the combination of a black dye and a developer which were materials for a heat-sensitive color-developing layer was replaced with S-205/BPA, in order to form the heat-sensitive color-developing layer. Furthermore, the water-soluble near infrared absorbent in Example 1 was replaced with ICIS109564/2 which was a dispersible near infrared absorbent. Following the same procedure as in Example 1, wet dispersion was then performed by means of a sand grinder until an average particle diameter was 1.5 μm, and the dispersible near infrared absorbent was then mixed with a protective layer solution so that a surface reflectance at 830 nm might be 30%, in order to obtain an optical recording paper. Afterward, recording and evaluation were carried out under the same conditions as in Example 7. The results are set forth in Table 1.

Black dye: S-205: 3-(N-ethyl-N-isoamyl)-6-methyl-7-anilinofluran.

As indicated by Table 1, in the optical recording medium in which the surface reflection at the dominant wave length of a recording laser beam is from 15 to 80%, the balance between a color density and a ground color is good irrespective of kinds of used heat-sensitive color-developing material and near infrared absorbent, and the contrast of a recorded image is enough to read it by the naked eye.

COMPARATIVE EXAMPLE 1

The same procedure as in Example 1 was repeated with the exception that the near infrared absorbent solution (C) and the protective layer solution (D) used in Example 1 were mixed with each other so that the reflectance of a optical recording medium product at 780 nm might be 70%, in order to obtain the optical recording medium. Evaluation was then made.

COMPARATIVE EXAMPLE 2

The same procedure as in Example 8 was repeated with the exception that the near infrared absorbent solution used in Example 8 was blended with the protective layer solution so that the reflectance of a optical recording medium product at 830 nm might be 80%, in order to obtain the optical recording medium. Evaluation was then made.

COMPARATIVE EXAMPLE 3

The same procedure as in Example 1 was repeated with the exception that any near infrared absorbent solution (C) in Example 1 was not used, in order to obtain the optical recording medium. Evaluation was then made similarly.

As indicated by the results in Table 1 regarding Comparative Examples 1, 2 and 3, when the surface reflectance of the optical recording medium at the dominant wave length of the recording laser beam is in excess of 65%, the ground color is good, but the optical recording medium does not absorb so much light as to release a heat quantity enough to cause the heat-sensitive color-developing layer to develop the color. Therefore, it is definite that the visually perceptible image cannot be recorded. In the optical recording medium in which the surface reflectance at the dominant wave length of the recording laser beam is less than 15%, the color density measured by the densitometer is very high, but the contrast is poor when observed by the naked eye, since the ground color is also very dense.

EXAMPLES 9 to 21

| [Color-developing layer] | |
|---|---|
| Solution A (dye dispersion) | |
| Dye shown in Table 2 | 2.0 parts |
| 10% Aqueous polyvinyl alcohol solution | 3.4 parts |
| Water | 1.9 parts |
| Total | 7.3 parts |

Abbreviations of the dyes shown in Table 2 mean the following compounds:
ODB: 3-Diethylamino-6-methyl-7-anilinofluoran
S-205: 3-(N-Ethyl-N-isoamylamino)-6-methyl-7-anilinofluoran
ODB-2 Dibutylamino-6-methyl-7-anilinofluoran

| Solution B (developer dispersion) | |
|---|---|
| Developer shown in Table 2 | 6.0 parts |
| Parabenzylbiphenyl | 4.0 parts |
| 10% Aqueous polyvinyl alcohol solution | 12.5 parts |
| Water | 2.5 parts |
| Total | 25.0 parts |

Abbreviations of the dyes shown in Table 2 mean the following compounds:
BPA: Bisphenol A
POB: p-Hydroxybenzoic acid benzyl The solutions A and B were prepared by separately wet-grinding the above-mentioned compositions for 1 hour by means of a sand grinder for tests.

Next, the heat-sensitive color-developing layer coating solution was prepared by mixing 7.3 parts of the solution A (dye dispersion), 25 parts of the solution B (developer dispersion) and 25 parts of a 25% aqueous silica dispersion (Mizusawa Chemical Co., Ltd.; trade name Mizucasil P-527). A fine paper having a basis weight of 60 g/m$^2$ was coated with the above-mentioned coating solution by a meyer bar so that the amount of the coating solution might be 5 g/m$^2$, followed by drying, in order to obtain a recording sheet.

Light-absorbing layer

The following composition containing each soluble near infrared absorbent shown in Table 2 was wet-ground:

TABLE 1

| | Heat-sensitive Material | | Near Infrared Absorbent | | Reflectance | | Evaluation | |
|---|---|---|---|---|---|---|---|---|
| | Dye | Developer | Kind | Diameter[*1] | 780 nm | 830 nm | Color Density | Ground Color |
| Example 1 | ODB | BPA | ICIS116510[*2] | | 20% | | 1.40 | 0.36 |
| Example 2 | " | " | " | | 30% | | 1.38 | 0.30 |
| Example 3 | " | " | 2 | | 40% | | 1.37 | 0.28 |
| Example 4 | " | " | Kayasorb IR-750 | 2.5μ | 80% | | 1.36 | 0.25 |
| Example 5 | " | " | Kayasorb IR-750 | 1.5μ | 65% | | 1.35 | 0.20 |
| Example 6 | " | POB | ICIS116510[*2] | | 15% | | 1.35 | 0.19 |
| Example 7 | ODB-2 | BPA | ICIS109564[*2] | | | 30% | 1.35 | 0.21 |
| Example 8 | S-205 | BPA | ICIS109564/2 | 1.5μ | | 30% | 1.35 | 0.19 |
| Comp. Ex. 1 | ODB | BPA | ICIS116510[*2] | | 70% | | 0.06 | 0.06 |
| Comp. Ex. 2 | S-205 | BPA | ICIS109564/2 | 1.5μ | | 80% | 0.06 | 0.06 |
| Comp. Ex. 3 | ODB | BPA | not used | | 95% | | 0.04 | 0.04 |

[*1] Average particle diameter
[*2] Soluble type

| Solution C | |
|---|---|
| Soluble near infrared absorbent | 20 parts |
| 10% Aqueous polyvinyl alcohol solution | 50 parts |
| Water | 30 parts |
| Total | 100 parts |

The near infrared absorbents in Table 2 are as follows:

ICIS116510 is the trade name of the near infrared absorbent made by I.C.I. in England.

NK-125 is the trade name of the near infrared absorbent made by Nippon Kanko Shikiso Co., Ltd.

| Solution D: Binder solution | |
|---|---|
| 10% Aqueous polyvinyl alcohol solution | 100 parts |
| Glyoxal (40%) | 5 parts |
| Total | 105 parts |

The light-absorbing layer was prepared by mixing the solutions C and D so as to obtain each reflectance shown in Table 2, and then coating the above-mentioned heat-sensitive layer with the resulting mixture so that the amount of the coating might be 2 g/m$^2$ by the use of a meyer bar, followed by drying, thereby forming an optical recording paper.

Next, the thus formed optical recording paper was stuck to each film or plate, or each film or plate shown in Table 2 which had been subjected to a reflection-preventing treatment by the use of a PVA adhesive which had a less influence on the color-developing layer, in order to obtain an optical recording medium having a protective medium. As the protective media of Examples 9 to 16 in Table 2, a PET (polyethylene terephthalate) film which had not undergone the reflection-preventing treatment was used. The protective media of Examples 17 and 21 were prepared by disposing the following reflection-preventing film on each film or plate of materials shown in Table 2.

A film material was heated up to 60° C. in a vacuum container, and aluminum was then deposited in a thickness of about 4 mμ thereon. In addition, MgF was further deposited thereon so that the thickness of the MgF might be ¼ of a recording wave length (if the recording wave length was 830 mμ, about 0.21μ), in order to obtain a light reflection-preventing film thereon.

The thus obtained optical recording paper was then irradiated by the use of a semiconductor laser device (laser diode collimator head LDC-8330-CINC; Applied Optic Co., Ltd.; central wave length 830 nm, output 30 mW) as shown in FIG. 1 in order to carry out printing. A condenser (Olympus Optical Co., Ltd.; MDPLAN 5, 0.1) was used, and an irradiation time was 1/500 second.

The density of the colored image was determined by first measuring a color spot with a microdensitometer (made by Konishiroku Photo Industry Co., Ltd.; PDM-5), and then converting a measured value into a Macbeth density.

A ground color, i.e., a non-image portion was measured by a Macbeth densitomer.

For the purpose of inspecting the effect of the protective medium, water resistance and oil resistance tests were carried out by using water and the plasticizer DOP (dioctyl phthalate) before and after the light irradiation, i.e., before and after the recording operation.

A 5-mm-thick 2-cm-wide 2-cm-long sponge containing distilled water and DOP was put on the surface of the portion of unrecorded sample on which the recording would be made or the portion of the recorded sample on which the recording had been made, and the sample was then allowed to stand at room temperature for 24 hours. Afterward, the songe was removed therefrom and the remaining distilled water or DOP on the surface was wiped off, and the sample which had not been recorded was irradiated with a recording light. Next, the color density and the ground color were measured by means of the microdensitometer or the Macbeth densitometer. The density of recorded image and the ground color were similarly measured for the recorded sample.

COMPARATIVE EXAMPLES 4 to 8

Each optical recording paper was prepared by using a heat-sensitive color-developing material and a near infrared absorbent shown in Table 2 in accordance with the same procedure as in the examples. In this case, the heat-sensitive color-developing material was used in the same proportion as in the examples, but the near infrared absorbent was used in such a ratio as to obtain a reflectance shown in Table 2, and no protective medium was disposed. The light-absorbing layer of the optical recording medium in each comparative example had a polyvinyl alcohol film cured with glyoxal, and this cured film was also functional as a protective layer for the heat-sensitive color-developing layer. Therefore, water resistance and wear resistance of the recording medium were so high that the recording layer was not peeled off, even when the surface of the recording medium was rubbed with a wet finger of a man.

The optical recording medium of each comparative example was subjected to the same light irradiation as in the examples, and an image density and a ground color were measured. Furthermore, water resistance and oil resistance tests were carried out in the same manner as in the examples before and after the recording operation in order to measure a color development degree and an image remaining state. The results are set forth in Table 2.

As is apparent from the same table, with regard to the optical recording medium having the protective medium of the present invention, any color development performance does not change, even if the recording medium is brought into contact with water or a plasticizer before the light irradiation. However, as for the optical recording medium of each comparative example having no protective medium, any color development having a practical density cannot be obtained, though the similar film which takes the place of the protective film is formed thereon.

This tendency is also seen in the case of the durability of the recored image. That is, in the optical recording medium having the protective medium of the present invention, any developed color did not change, even if the recored image was brought into contact with water or a plasticizer for a long period of time, whereas in the optical recording medium of each comparative example having no protective medium, the image vanished substantially, when subjected to the similar conditions.

TABLE 2

| Protective Medium | Recording Layer |
|---|---|

TABLE 2-continued

| | Material | Thickness | Reflection Preventing Film | Heat-sensitive Material | | Reflectance 830 nm | Light-Absorbing Material |
|---|---|---|---|---|---|---|---|
| | | | | Dye | Developer | | |
| Example 9 | PET film | 50μ | — | ODB | BPA | 15% | ICIS116510 |
| Example 10 | PET film | 50μ | — | ODB | BPA | 20% | ICIS116510 |
| Example 11 | PET film | 50μ | — | ODB | BPA | 30% | ICIS116510 |
| Example 12 | PET film | 50μ | — | ODB | BPA | 50% | ICIS116510 |
| Example 13 | PET film | 50μ | — | ODB | BPA | 50% | ICIS116510 |
| Example 14 | PET film | 50μ | — | ODB | BPA | 60% | ICIS116510 |
| Example 15 | PET film | 50μ | — | ODB | BPA | 65% | ICIS116510 |
| Example 16 | Polyester | 50μ | — | ODB | POB | 25% | ICIS116510 |
| Example 17 | MMA plate | 3 mm | O | ODB | POB | 25% | ICIS116510 |
| Example 18 | PVA film | 50μ | O | ODB-2 | BPA | 25% | ICIS116510 |
| Example 19 | Polycarbonate | 50μ | O | ODB-2 | BPA | 25% | ICIS116510 |
| Example 20 | MMA plate | 1 mm | O | S-205 | BPA | 60% | ICIS116510 |
| Example 21 | MMA plate | 1 mm | O | S-205 | BPA | 65% | NK-125 |
| Comp. Ex. 4 | none | | | ODB | BPA | 50% | ICIS116510 |
| Comp. Ex. 5 | none | | | ODB | POB | 25% | ICIS116510 |
| Comp. Ex. 6 | none | | | ODB-2 | BPA | 25% | ICIS116510 |
| Comp. Ex. 7 | none | | | ODB | BPA | 50% | ICIS116510 |
| Comp. Ex. 8 | none | | | S-205 | BPA | 60% | NK-125 |

| | Evaluation (optical density) | | | | | |
|---|---|---|---|---|---|---|
| | Usual Recording | | Water Resistance and Oil Resistance of Recording Paper Color Density | | Water Resistance and Oil Resistance of Image Color Density | |
| | Density Color | Ground Color | Water | DOP | Water | DOP |
| Example 9 | 1.42 | 0.65 | 1.42 | 1.41 | 1.41 | 1.42 |
| Example 10 | 1.40 | 0.20 | 1.40 | 1.40 | 1.39 | 1.39 |
| Example 11 | 1.38 | 0.18 | 1.38 | 1.38 | 1.37 | 1.38 |
| Example 12 | 1.36 | 0.12 | 1.36 | 1.36 | 1.36 | 1.36 |
| Example 13 | 1.36 | 0.12 | 1.35 | 1.36 | 1.36 | 1.36 |
| Example 14 | 1.35 | 0.09 | 1.35 | 1.35 | 1.34 | 1.35 |
| Example 15 | 1.31 | 0.08 | 1.31 | 1.30 | 1.31 | 1.31 |
| Example 16 | 1.35 | 0.19 | 1.35 | 1.34 | 1.34 | 1.35 |
| Example 17 | 1.35 | 0.21 | 1.35 | 1.34 | 1.35 | 1.34 |
| Example 18 | 1.35 | 0.21 | 1.35 | 1.34 | 1.34 | 1.34 |
| Example 19 | 1.35 | 0.21 | 1.35 | 1.35 | 1.35 | 1.35 |
| Example 20 | 1.32 | 0.09 | 1.32 | 1.31 | 1.31 | 1.31 |
| Example 21 | 1.30 | 0.09 | 1.30 | 1.29 | 1.30 | 1.03 |
| Comp. Ex. 4 | 1.32 | 0.13 | 0.66 | 0.06 | 0.84 | 0.08 |
| Comp. Ex. 5 | 1.34 | 0.09 | 0.92 | 0.08 | 1.17 | 0.06 |
| Comp. Ex. 6 | 1.36 | 0.20 | 0.75 | 0.07 | 1.06 | 0.08 |
| Comp. Ex. 7 | 1.38 | 0.20 | 0.70 | 0.07 | 0.92 | 0.10 |
| Comp. Ex. 8 | 1.36 | 0.10 | 0.63 | 0.04 | 1.12 | 0.04 |

EXAMPLE 22

The optical recording paper 4 prepared in accordance with the same procedure as in Example 1 was irradiated with a laser beam by the use of a device shown in FIG. 1 in which a semiconductor laser head 1 (laser diode collimator head LDC-8330-CINC; Applied Optic Co., Ltd.; central wave length 830 nm, output 30 mW) was combined with a condenser 3, in order to perform optical printing The used condenser was composed of lenses having numerical apertures (N.A values) of 0.4, 0.5, 0.28 and 0.16, and an irradiation time was 1/500 second.

In the drawing, reference numeral 2 is a shutter, numeral 5 is a power source, 6 is a paralleled laser beam, 7 is a condensed point, and 8 is an operation distance.

The density of a recorded image and a ground color were measured as follows, and the results are set forth in Table 3.

The density of the recorded image (color spot): Measurement was carried out by the use of a densitometer (made by Konishiroku Photo Industry Co., Ltd.; trade name PDM-5), and a measured value was then converted into a Macbeth density.

The ground color of the optical recording paper: This was measured by a Macbeth densitometer.

EXAMPLE 23

The same procedure as in Example 22 was repeated with the exception that the combination of the black dye and the developer used for the heat-sensitive color-developing layer in Example 22 was ODB/POB, ODB-2/BPA or S-205/BPA, in order to prepare an optical recording paper. Afterward, recording was performed by the use of a condenser having a numerical apeature of 0.28 in the same procedure as in Example 22. The measured values of an image density and a ground color are set forth in Table 3.

Compounds of the black dye and the developer are as follows:

Dye ODB-2: Dibutylamino-6-methyl-7-anilinofluoran

S-205: 3-(N-Ethyl-N-isoamyl)-6-methyl-7-anilinofluoran

Developer: POB: p-Hydroxybenzoic acid benzyl ester

COMPARATIVE EXAMPLE 9

The same procedure as in Example 22 was repeated with the exception that the optical recording paper of Example 22 was irradiated with a laser beam by the use of condensers having numerical apertures of 0.62 and 0.08 and by the use of no condenser. The measured values of an image density and a ground color are set forth in Table 3.

As is apparent from Table 3, when the condensers having N.A values in the range of the present invention are used, sharp black images can be obtained irrespective of the combination of the dye and the developer in the heat-sensitive color-developing layer. However, when the condenser of Comparative Example 9 is used which has an N.A value of 0.62 out of the range of the present invention, the operation distance is 0.8 mm or less, and the condenser comes in contact with the recording paper inconveniently, so that any image cannot be recorded. In addition, when the N.A value is 0.08, a printing energy is insufficient, and the printed image is too faint and a contrast with a ground color is also too low to read out by the naked eye. Moreover, when any condenser is not used, any image is not obtained.

TABLE 3

|  | Heat-sensitive Material |  | Condenser Numerial | Evaluation |  |
|---|---|---|---|---|---|
|  | Dye | Developer | Aperture | Color Density | Ground Color |
| Example 22 | ODB | BPA | 0.4 | 1.35 | 0.12 |
|  | " | " | 0.5 | 1.40 | " |
|  | " | " | 0.28 | 1.37 | " |
|  | " | " | 0.16 | 1.30 | " |
| Example 23 | ODB | POB | 0.28 | 1.38 | " |
|  | ODB-2 | BPA | " | 1.37 | " |
|  | S-205 | BPA | " | 1.38 | " |
| Comp. Ex. 9 | ODB | BPA | 0.62 | — | " |
|  | " | " | 0.08 | 0.36 | " |
|  | " | " | not used | 0.12 | " |

As discussed above, when a reflectance at the dominant wave length of a recording laser beam on the surface of an optical recording medium is 15 to 65%, an image having a contrast enough to read out by the naked eye can be recorded by the low-output laser beam, the aforesaid optical recording medium being composed of a substrate, a heat-sensitive color-developing layer containing a basic dye and an organic developer, and a light-absorbing layer containing a near infrared absorbent which are superposed upon the substrate. In order to obtain this reflectance, a water-soluble near infrared absorbent or a finely ground dispersible infrared absorbent is used, whereby safety and a manufacturing process are improved and the practical optical recording medium can be obtained effectively.

In the optical recording medium having a protective medium of the present invention, a color-developing layer is recorded in the recording medium, and therefore the unstable color-developing layer is sufficiently protected. For this reason, application fields of the optical recording medium increase, and the recording and retention of an image are ensured even in circumstances where utilization has been heretofore difficult. In addition, the sharp image can be recorded by the low-output laser beam.

The laser recording medium which can keep ambient contaminations off permits effectively utilizing a compact semiconductor laser having a stable output, and it also contributes to the advancement of putting a heat mode optical recording medium into practice In the case that an optical recording medium comprising a hydrophilic substrate, a light-absorbing layer having a near infrared absorbent, and a heat-sensitive color-developing layer containing a basic dye and an organic developer which are superposed upon the substrate is recorded by a laser beam, a visually readable image can be recorded thereon by the use of a condenser having a focal length of 0.5 mm or more and a numerical aperture (N.A) of 0.1 to 0.5, even if the hydrophilic substrate inherently has a rough surface and is winding. Therefore, the employment of the low-output laser is possible, and the optical recording medium also contributes to the advancement of putting a heat mode optical recording medium into practice.

What is claimed is:

1. An optical recording medium on which recording is made by a laser beam having the dominant wave length in the vicinity of near infrared rays which comprises a substrate, a heat-sensitive color-developing layer containing a basic dye and an organic developer, and a light-absorbing layer containing a near infrared absorbent, said layers being superposed upon said substrate, wherein a reflectance at the dominant wave length of a laser beam on the surface of said recording medium being from 15 to 65%.

2. An optical recording medium according to claim 1 wherein said near infrared absorbent is a water-soluble organic near infrared absorbent or a finely ground organic near infrared absorbent.

3. An optical recording medium with a protective medium on which recording is made by a laser beam having a dominant wave length in the vicinity of near infrared rays, said optical recording medium being characterized by comprising a substrate, a heat-sensitive color-developing material comprising a basic colorless dye and an organic developer which causes said dye to develop a color when thermally dissolved, a recording layer containing water or an organic solvent-soluble near infrared absorbent and/or water and an organic solvent-insoluble near infrared absorbent which absorb near infrared rays and generate heat, and a protective medium which is permeable to visible rays and the near infrared rays and which is superposed upon said recording layer.

4. An optical recording medium having a protective medium according to claim 3 wherein the reflectance at said dominant wave length of said recording beam on the surface of said optical recording layer is from 15 to 65%.

5. An optical recording medium having a protective medium according to claim 3 or 4 wherein said protective medium has the surface subjected to a reflection-preventing treatment.

6. A laser optical recording device in which recording is made on an optical recording medium comprising a hydrophilic substrate, a light-absorbing layer containing a near infrared absorbent, and a heat-sensitive color-developing layer containing a basic dye and an organic developer, said layers being superposed upon said substrate, said device being characterized by comprising a laser beam generation element and a laser beam condenser having a focal length of 0.5 mm or more and a numerical aperture (N.A) of 0.1 to 0.5.

* * * * *

UNITED STATES PATENT AND TRADEMARK OFFICE
CERTIFICATE OF CORRECTION

PATENT NO. : 5,100,711
DATED : March 31, 1992
INVENTOR(S) : SATAKE et al.

It is certified that error appears in the above-indentified patent and that said Letters Patent is hereby corrected as shown below:

Column 2, line 8, change "1500 $\mu$m" to --1500 nm--;

Column 3, line 49, change "650 $\mu$m to 1500 $\mu$m" to --650 to 1500 nm--;

Column 3, line 52, change "900 $\mu$m" to --900 nm--;

Column 19, line 44, change "4 m$\mu$" to --4 nm--;

Column 19, line 47, change "830 m$\mu$" to --830 nm--; and,

Column 19, line 47, change "0.21 $\mu$" to --210 nm--.

Signed and Sealed this

Seventeenth Day of May, 1994

Attest:

BRUCE LEHMAN

*Attesting Officer*          *Commissioner of Patents and Trademarks*